(12) United States Patent
Caprara

(10) Patent No.: US 8,559,472 B2
(45) Date of Patent: Oct. 15, 2013

(54) SINGLE-MODE INTRA-CAVITY FREQUENCY-DOUBLED CW SOLID-STATE LASER WITH VOLUMETRIC GAIN-GRATING

(75) Inventor: Andrea Caprara, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 309 days.

(21) Appl. No.: 13/038,598

(22) Filed: Mar. 2, 2011

(65) Prior Publication Data

US 2012/0224595 A1 Sep. 6, 2012

(51) Int. Cl.
*H01S 3/10* (2006.01)
(52) U.S. Cl.
USPC ............. 372/22; 372/67; 372/70; 372/93
(58) Field of Classification Search
USPC ............................................. 372/22
See application file for complete search history.

(56) References Cited

U.S. PATENT DOCUMENTS

| | | | | |
|---|---|---|---|---|
| 4,167,712 | A * | 9/1979 | Esterowitz et al. | 372/70 |
| 4,236,124 | A * | 11/1980 | Rockwood | 372/96 |
| 5,546,222 | A | 8/1996 | Plaessmann et al. | |
| 5,615,043 | A | 3/1997 | Plaessmann et al. | |
| 5,644,589 | A * | 7/1997 | Anthon | 372/92 |
| 6,339,605 | B1 * | 1/2002 | Vetrovec | 372/35 |
| 6,577,666 | B2 | 6/2003 | Erhard et al. | |
| 6,778,580 | B2 | 8/2004 | Erhard et al. | |
| 7,522,646 | B2 | 4/2009 | Brick et al. | |
| 2005/0078718 | A1 * | 4/2005 | Spinelli et al. | 372/22 |
| 2005/0281308 | A1 * | 12/2005 | Kim | 372/70 |
| 2008/0259969 | A1 * | 10/2008 | Piper et al. | 372/3 |
| 2009/0201952 | A1 * | 8/2009 | Luo et al. | 372/5 |

OTHER PUBLICATIONS

Spinelli, Luis A. et al., Unpublished U.S. Appl. No. 12/641,184, filed on Dec. 17, 2009, titled "Resonant Pumping of Thin-Disk Laser With an Optically Pumped External-Cavity Surface-Emitting Semiconductor Laser" 35 pages.

Hertwig, Michael et al., Unpublished U.S. Appl. No. 12/759,465, filed on Apr. 13, 2010, titled "Polarization Maintaining Multi-Pass Imaging System for Thin-Disk Amplifiers and Oscillators" 33 pages.

Baer, T., "Large-amplitude fluctuations due to longitudinal mode coupling in diode-pumped intracavity-doubled Nd: YAG lasers", J. Opt. Soc. Am. B, vol. 3, No. 9, Sep. 1986, pp. 1175-1180.

* cited by examiner

*Primary Examiner* — Xinning Niu
(74) *Attorney, Agent, or Firm* — Morrison & Foerster LLP

(57) ABSTRACT

A solid state-gain medium is in the form of a thin disk backed by a reflective coating. A laser resonator is formed by the reflective coating and another mirror. Optical pump radiation is directed into the thin-disk gain-medium for energizing the gain-medium and generating a standing wave of fundamental-wavelength radiation in the resonator. The pump-radiation is directed into the gain-medium at an angle to the resonator axis and pump-radiation fringes are formed by interference between incident and reflected pump-radiation. The pump-radiation angle is selected such that the pump-radiation fringes are aligned with antinodes of the fundamental-wavelength standing wave.

16 Claims, 13 Drawing Sheets

SINGLE-MODE INTRA-CAVITY FREQUENCY-DOUBLED CW SOLID-STATE LASER WITH VOLUMETRIC GAIN-GRATING

TECHNICAL FIELD OF THE INVENTION

The present invention relates in general to lasers delivering ultraviolet (UV) radiation by frequency-conversion of fundamental laser radiation having a wavelength in the visible or a longer-wavelength region of the electromagnetic spectrum. The invention relates in particular to semiconductor-laser pumped solid-state lasers delivering UV radiation by frequency-doubling fundamental radiation from a solid-state-gain-medium.

DISCUSSION OF BACKGROUND ART

There a several laser applications that require relatively high average power, for example, greater than one-hundred milliwatts (mW) average power, of continuous wave (CW) UV laser radiation at some UV wavelength between about 200 nanometers (nm) and 400 nm. Such applications include wafer and mask inspection in the semiconductor industry.

Commercially available lasers suitable for this purpose include solid-state and optically pumped semiconductor (OPS) lasers in which UV radiation is generated by frequency conversion of fundamental wavelengths in the near infrared spectral region to third-harmonic or fourth-harmonic wavelengths. By way of example, a 1064 nanometer (nm) fundamental wavelength of neodymium-doped yttrium vanadate (Nd:YVO$_4$) can be converted to a third-harmonic wavelength of about 353 nm or a fourth-harmonic wavelength of about 266 nm using two stages of frequency conversion. Intra-cavity (intra-resonator) frequency conversion is usually employed for generating CW harmonic radiation. The need for two intra-cavity (IC) frequency conversion stages adds cost and complexity to a laser resonator. IC-frequency tripling and quadrupling, however, are rather complex and require complex control technology to ensure that the laser output power and beam-pointing are stable. Further, the efficiency of a two-stage IC CW frequency converted laser is typically relatively low, for example less than about 3% of pump-power.

One approach to avoiding the measures needed to stably operate an intra-cavity frequency-tripled or frequency-quadrupled laser would be to configure an intra-cavity frequency doubled laser having a gain-medium such as praseodymium-doped yttrium lithium fluoride (Pr:YLF) that can deliver several fundamental wavelengths between about 500 nm and 750 nm. Within this wavelength range, Pr:YLF has transitions (gain-lines) at about 522 nm, about 644 nm, and about 720 nm among others. Fundamental wavelengths of 522 nm and 720 nm, when frequency doubled, would provide UV wavelengths of 261 nm and 360 nm respectively. Optical pump radiation for energizing these transitions of Pr:YLF would need to have a (blue) wavelength of between about 430 nm and 490 nm. In order to generate more than 100 mW of UV output a pump-power of between about 2 and 4 Watts (W) would be required Earlier, this approach has not been practical due to due to lack of blue-light emitting diode-lasers having sufficient output power. Now, however, diode-lasers having such an output power in the required wavelength range are commercially available. This offers the prospect of a relatively efficient and relatively inexpensive solid-state UV laser. However, absent any counter measure, such a laser would still have a problem common to all IC frequency-doubled solid-state lasers, i.e., that of noisy and chaotic operation.

This noisy and chaotic operation occurs because solid-sate gain-media doped with rare earth or transition metals such as neodymium (Nd), thulium (Tm), holmium (Ho), erbium (Er), ytterbium (Yb), chromium (Cr), and praseodymium (Pr) all have long excited-state lifetimes ranging from several microseconds (μs) to a few milliseconds (ms). Theses long lifetimes lead to longitudinal mode-coupling which can cause fluctuations of circulating power and harmonic output power.

The problem was first recognized in a paper "*Large-amplitude Fluctuations Due to Longitudinal Mode Coupling in Diode-Pumped Intracavity-Doubled Nd: YAG Lasers*" T. Baer, J. Opt. Soc. Am., 3, 9, (1175-1179), September 1986. The authors concluded that when doing intra-cavity frequency-conversion in lasers with such gain-media, the long excited-state lifetimes gave rise to chaotic noise fluctuations and instability in the frequency converted output because of mode-coupling effects. These chaotic fluctuations became known to practitioners of the art as "the green problem" having been described in terms of frequency-doubling 1064-nm (Near-IR) radiation to provide 533-nm (green) radiation.

One solution to the green-problem that has enjoyed commercial success is to perform intra-cavity frequency-doubling in a traveling-wave ring-resonator operating in a single longitudinal mode to avoid the mode-coupling. Such a ring resonator is readily operable in a single longitudinal mode because the traveling wave eliminates the problem of spatial hole-burning which complicates single-mode operation in standing wave resonators. A traveling-wave ring-resonator, however, would not be practical for 522 nm radiation generated by Pr:YLF because optical diodes needed to achieve unidirectional circulation in the resonator have too much absorption at this wavelength. Accordingly, a standing-wave resonator would be required for a single-mode IC frequency-doubled Pr:YLF laser delivering 261 nm radiation.

The spatial hole-burning complication of single-mode operation of a standing-wave solid-state laser arises because the desired single mode saturates gain at antinode positions of the standing-wave in the solid-state gain-medium, leaving gain between the antinodes higher than at the antinodes. This provides that another possible mode, with antinodes between those of the desired mode, will preferentially oscillate then start the spatial hole-burning afresh. This leads to noisy multimode operation.

Measures that have been taken to mitigate the spatial hole-burning problem include using a relatively short gain-medium at one end of a resonator where the possible oscillation modes have antinodes relatively close together, and providing an intra-cavity spectrally selective device that can suppress modes adjacent a desired mode. A preferred such device is a free-standing uncoated etalon. Such an etalon is usually made from fused silica and can have essentially 100% transmission (the term "essentially" here recognizes that there may by some fractional percentage loss due to scatter).

Depending on resonator length, a fused silica etalon having a thickness of about 1.0 millimeter will have a transmission bandwidth (FWHM) comparable with the spectral width of saturated gain in Pr:YLF. Such an etalon however will have a free-spectral-range of only about 90 picometers (pm). This puts adjacent transmission peaks at wavelengths outside the depletion (saturation) region but within the gain-bandwidth of the Pr:YLF, which wavelengths could oscillate. The gain-bandwidth of Pr:YLF is about 1.2 nm (1200 pm) FWHM. In order to suppress transmission at these adjacent peaks it is necessary to provide a second etalon having a significantly higher free-spectral-range to suppress transmission peaks of the first etalon. Such an etalon would have a thickness of only about 100 micrometers (µm). Unless a transmission-peak wavelength of the thin etalon is precisely aligned with a transmission-peak wavelength of the thick etalon at the desired operating wavelength of the resonator, the net transmission of the two etalons will be less than 100% which could add significantly to resonator losses. There is a need to provide spectral selectivity in a Pr:YLF resonator sufficient to ensure single-mode operation without using an etalon pair including a thick etalon and a thin etalon.

SUMMARY OF THE INVENTION

In one aspect, laser apparatus in accordance with the present invention comprises a solid-state gain-medium in the form of a thin disk having first and second opposite surfaces. The gain-medium has a first mirror on the first surface thereof and has a fundamental emission-wavelength within a gain-bandwidth of the gain-medium. A standing-wave laser-resonator is formed between the first mirror on the thin-disk gain-medium and a second mirror, the resonator having a longitudinal axis. Coherent pump radiation from a source thereof is directed into the thin-disk gain-medium via the second surface thereof at a first angle to longitudinal optical axis such that the pump-radiation is incident on and reflected from the first mirror, thereby causing fundamental emission-wavelength radiation to circulate in the laser-resonator and form a standing wave in the laser-resonator. The first angle is selected such that the pump-radiation is incident on the first mirror at a predetermined second angle. The incident and reflected pump radiation interfere to form volumetric pump-radiation fringes, the pump-radiation fringes thereby forming corresponding volumetric gain-fringes in the gain-medium. The second angle is selected such that peaks of the gain-fringes are aligned with antinodes of the standing wave of the fundamental emission-wavelength radiation.

Alignment of the gain-fringes with antinodes of the standing wave maximizes the double-pass small-signal gain of the gain-medium gain to an extent such that when gain at the fundamental emission-wavelength is saturated due to the circulating laser-radiation, the saturated gain is still greater than the small-signal gain at any other wavelength in the gain-bandwidth of the gain-medium. This provides that fundamental radiation can oscillate in a single longitudinal mode at the wavelength of peak gain.

In a preferred embodiment of the present invention, the gain-medium is Pr:YLF, the pump-radiation wavelength is 471.96 nm, the fundamental emission wavelength is 522 nm, and an optically nonlinear crystal is located in the laser resonator and arranged to generate 261 nm (second harmonic) radiation from the circulating fundamental emission wavelength radiation.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
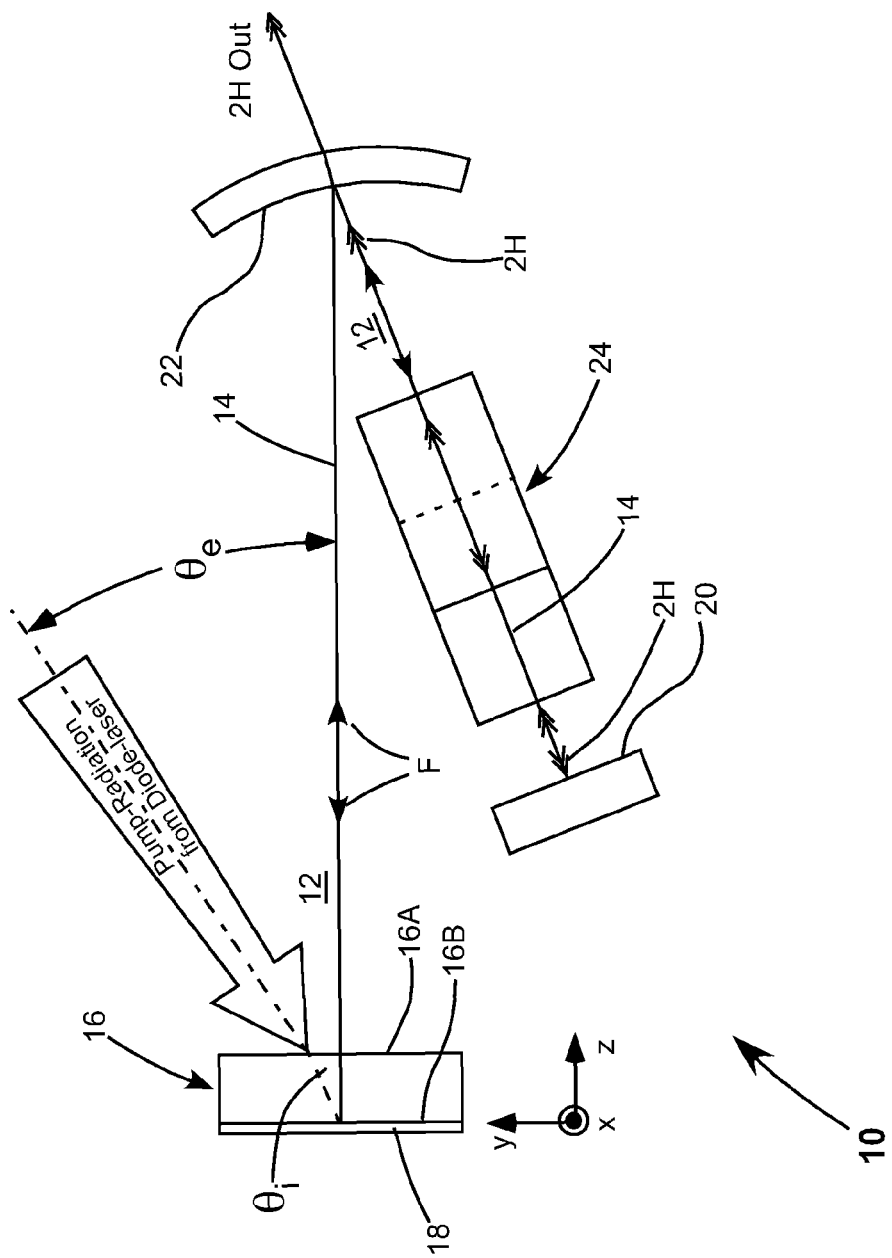
FIG. 1 schematically illustrates a simplified layout of a preferred embodiment of a frequency-doubled solid-state laser in accordance with the present invention including a once-folded standing-wave laser-resonator including a thin disk solid-state gain-medium backed by a reflector providing one end-mirror of the resonator, with coherent pump light directed into the gain-medium at an angle to the resonator axis and being reflected back from the reflector such that interference between the forward and reflected pump radiation forms pump-light fringes, the angle being selected such that the peaks of the pump-light fringes are aligned with antinodes of a standing wave in the resonator having a fundamental wavelength of the gain-medium, and an optically nonlinear crystal being included in the resonator for frequency-doubling the fundamental wavelength radiation to provide second-harmonic output radiation.

Referring now to the drawings, wherein like components are designated by like reference numerals, FIG. 1 schematically illustrates a simplified layout (for calculation purposes) of a preferred embodiment 10 of a frequency-doubled solid-state laser in accordance with the present invention. The laser has a once-folded, standing-wave laser-resonator 12 having a longitudinal optical axis (z-axis) 14 and transverse axes x and y perpendicular to each other and perpendicular to the z-axis.

Resonator 12 includes a solid-state gain-medium 16 in the form of a thin-disk gain-medium. The thin-disk gain medium preferably has a thickness between about 200 μm and 1000 μm with a thickness of 500 μm in examples described hereinbelow. Dimensions of the gain-medium are exaggerated in FIG. 1 for convenience of description. A more accurate description of dimensions and other details of the thin-disk gain-medium is presented further hereinbelow. The gain-medium is energized by pump light (pump radiation) from a diode-laser (not shown). It is critical to the operation of the present invention that the pump-light has a coherence length sufficient that the pump-light is still coherent in the gain-medium.

The pump light is directed into the gain-medium at an angle $\theta_e$ to the z-axis outside the gain-medium such that the pump-light inside the gain-medium is directed at a predetermined angle $\theta_i$ to the z-axis. The change in angle from $\theta_e$ to $\theta_i$ is due to refraction of light at the air-gain medium interface. Gain-medium 16 has a front surface 16A, through which the pump-light is directed, and a rear surface 16B, which is coated with a reflective coating 18. The reflective coating is highly reflective at a fundamental wavelength of the gain-medium and also highly reflective for the wavelength of the pump-light. Because the pump-light is coherent, pump-light reflected back from reflective coating 18 interferes with incident pump light to form pump-light fringes in the gain-medium with the fringing being more pronounced the closer the fringes are to the reflective coating (rear surface of the gain-medium). Angle θe is selected such that the intensity peaks of the pump-light fringes in the gain-medium are aligned with antinodes of the standing-wave of the fundamental mode in the gain-medium. A detailed description of the pump-light fringe formation is provided further hereinbelow.

Resonator 12 is terminated by reflective coating 18 and a plane mirror 20, and folded by a concave mirror 22. Between mirror 18 and mirror 20 is an optically nonlinear crystal 24 arranged to frequency-double fundamental radiation circulating in the resonator to provide second-harmonic (2H) radiation. The fundamental radiation is indicated by arrowheads F and the second-harmonic radiation is indicated by double arrowheads 2H. Mirror 22 is highly reflective at the wavelength of the fundamental mode and highly transmissive at the 2H-radiation wavelength. For purposes of this description it is assumed that the gain-medium is Pr:YLF operated at a fundamental wavelength of 522 nm yielding a 2H-wavelength of 261 nm in the UV region of the electromagnetic spectrum. Those skilled in the art will recognize however that principles of the present invention are applicable to Pr—YLF or other solid-state gain media operated at different fundamental wavelengths.

Figure 2A:
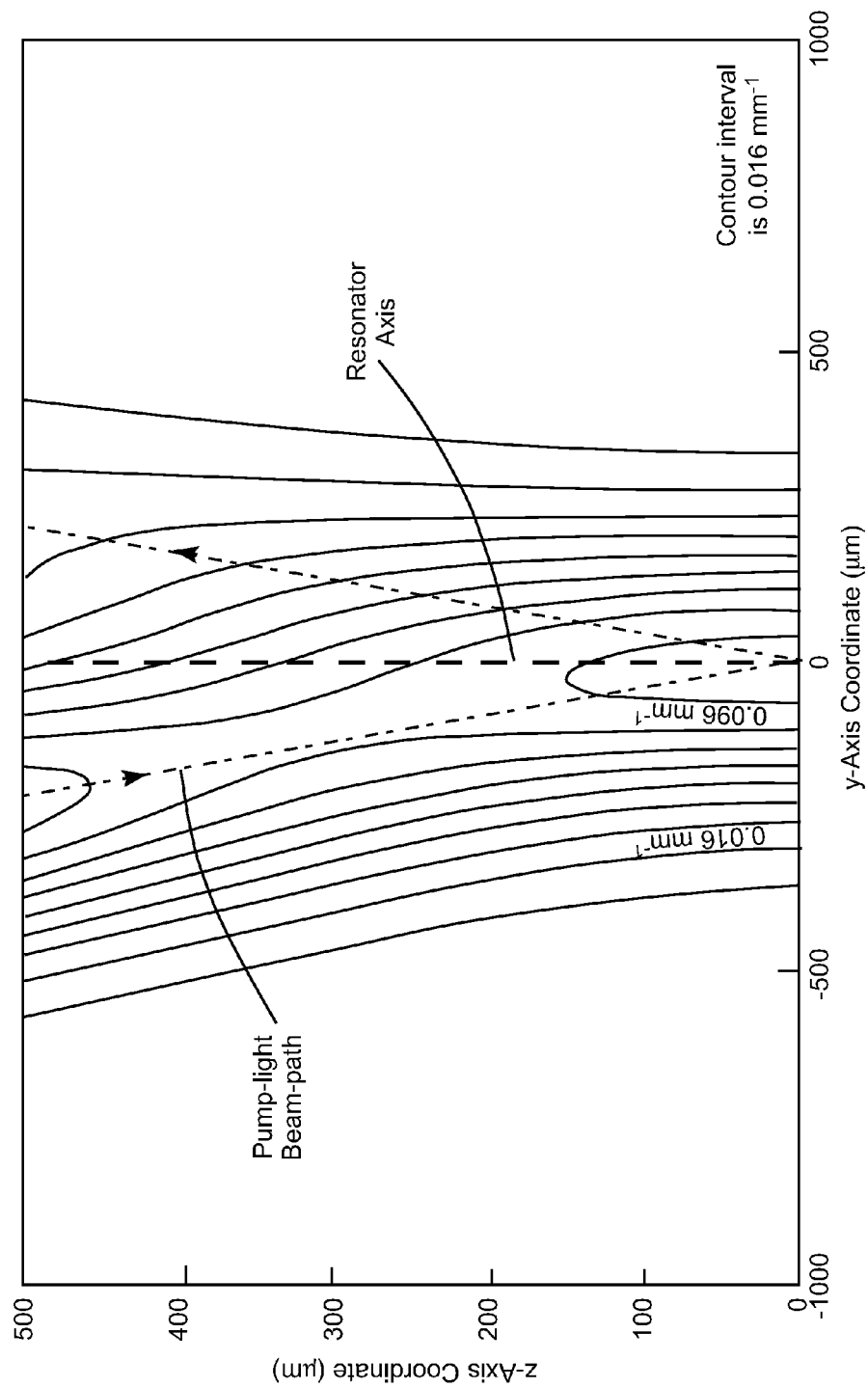
FIG. 2A is a graph schematically illustrating beam-averaged gain-contours in one example of a Pr:YLF gain-medium having a thickness of 500 micrometers and suitable as the gain-medium of the laser of FIG. 1.

FIG. 2A is a graph schematically illustrating calculated beam-averaged gain-contours in the y-z plane in one example of a 0.5% doped Pr:YLF gain-medium having a thickness of 500 micrometers, and suitable as the gain-medium of the laser of FIG. 1. This is how gain-contours would appear in the absence of fringing, i.e., if the pump light were incoherent. It is assumed in the calculation that the pump-light beam has an elliptical cross-section 300 mm by 50 mm, measure at the $1/e^2$ points, perpendicular to the propagation direction with the major axis aligned with the y-axis, and with 4.0 W of total-power in the incident beam. The pump-light beam-path is designated by a dashed line.

Figure 2B:
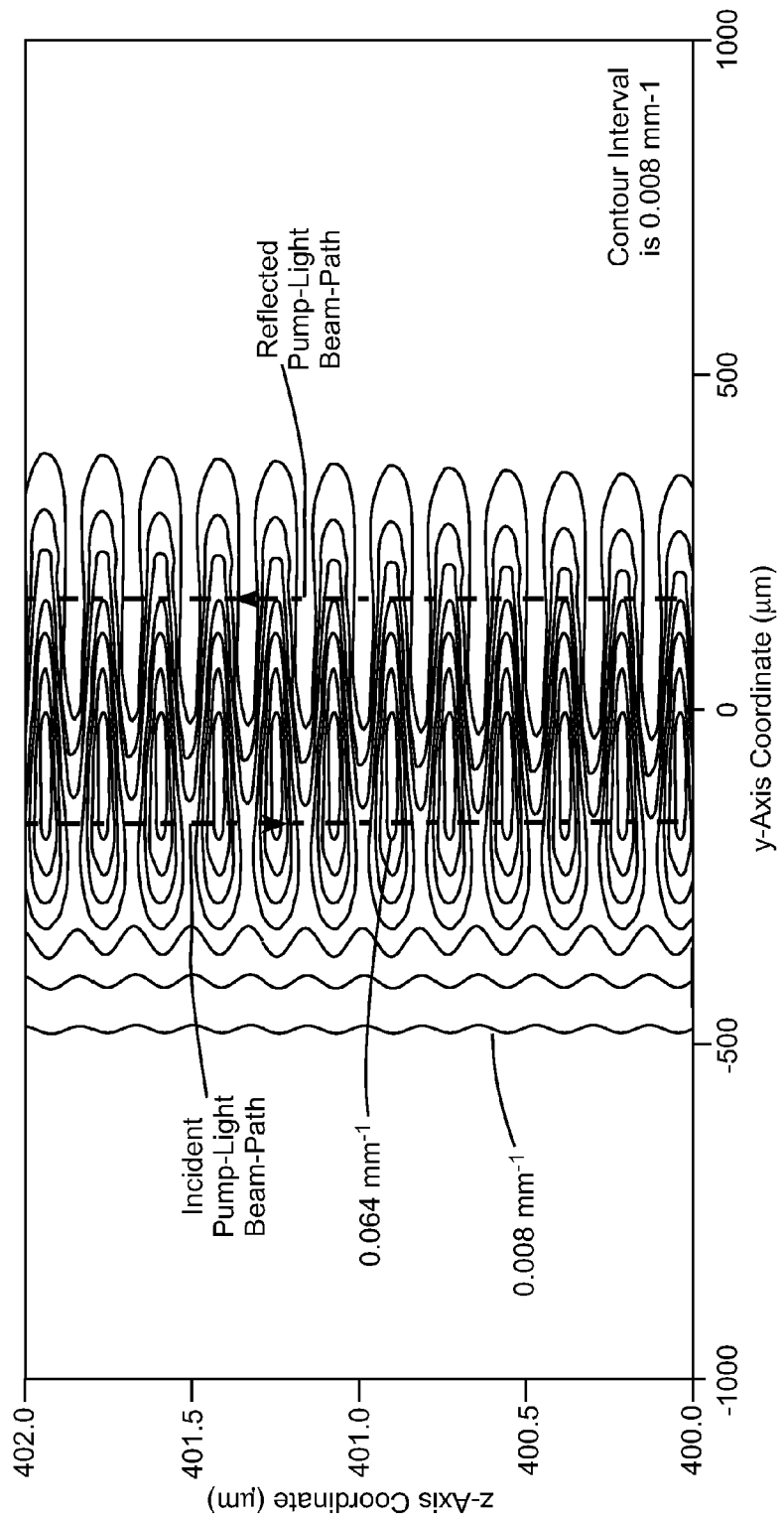
FIG. 2B is a graph schematically illustrating localized gain contours in the form of gain-fringes formed at a distance of 100 micrometers from the entrance surface of the gain-medium.

FIG. 2B is a graph schematically illustrating highly localized gain-contours in the y-z plane in the form of gain-fringes formed at a distance between 98 and 100 micrometers from front surface 16A of the gain-medium. Here, of course, it is assumed that the pump-light is sufficiently coherent to form fringes due to interference between the incident and reflected pump-light beams. Intensity distribution in the fringes is asymmetrical, here, due to the separation of the incident and reflected pump-light beam-path and the relatively long path-distance between the incident and reflected beams. The angle between these paths, in this drawing, is barely discernable, due to the relatively very-short z-axis length of the drawing.

Figure 2C:
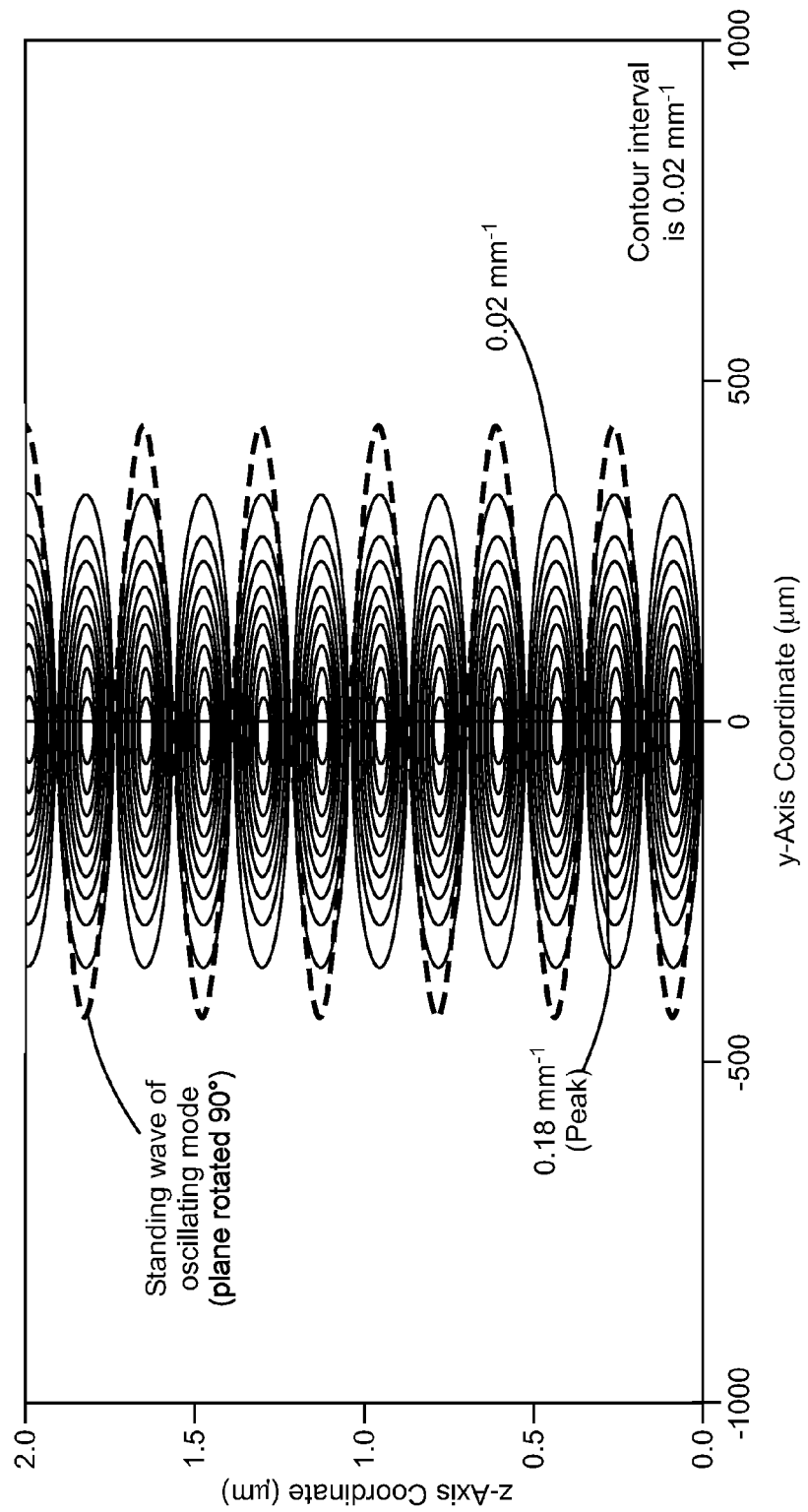
FIG. 2C is a graph schematically illustrating localized gain-contours in the form of gain-fringes formed adjacent the reflective surface of the gain-medium with the standing-wave amplitude of a single oscillating mode superimposed to depict alignment of antinodes of the mode with antinodes of the gain-fringes.

FIG. 2C is a graph again schematically illustrating highly-localized gain-contours in the y-z plane in the form of gain-fringes formed at a distance between zero and 2.0 micrometers from rear surface 16B of the gain-medium. In this short distance the difference between forward and reflected beam paths is not discernable, there is very little difference in intensity between incident and reflected beams, and the gain fringes are strongly defined and symmetrical as a result. A dashed curve indicates the amplitude of the fundamental-mode standing-wave with antinodes thereof aligned with antinodes of the gain-fringe pattern. This fringing transforms what would in the absence thereof be a homogeneous gain-medium into a "volumetric gain-grating" with gain essentially stratified or modulated in the gain-medium and with hundreds of gain-fringes in the thickness of the thin-disk gain medium. It is preferred for optimum results that the modulation depth or fringe contrast of the gain-fringes be greater or equal to about 90%. Here it should be noted that the fundamental mode amplitude is depicted in FIG. 2C, for convenience of illustration, in a plane rotated at 90° to the preferred plane of oscillation. The preferred plane of oscillation relative to a Pr:YLF gain-medium is discussed in detail further hereinbelow.

Figure 3A:
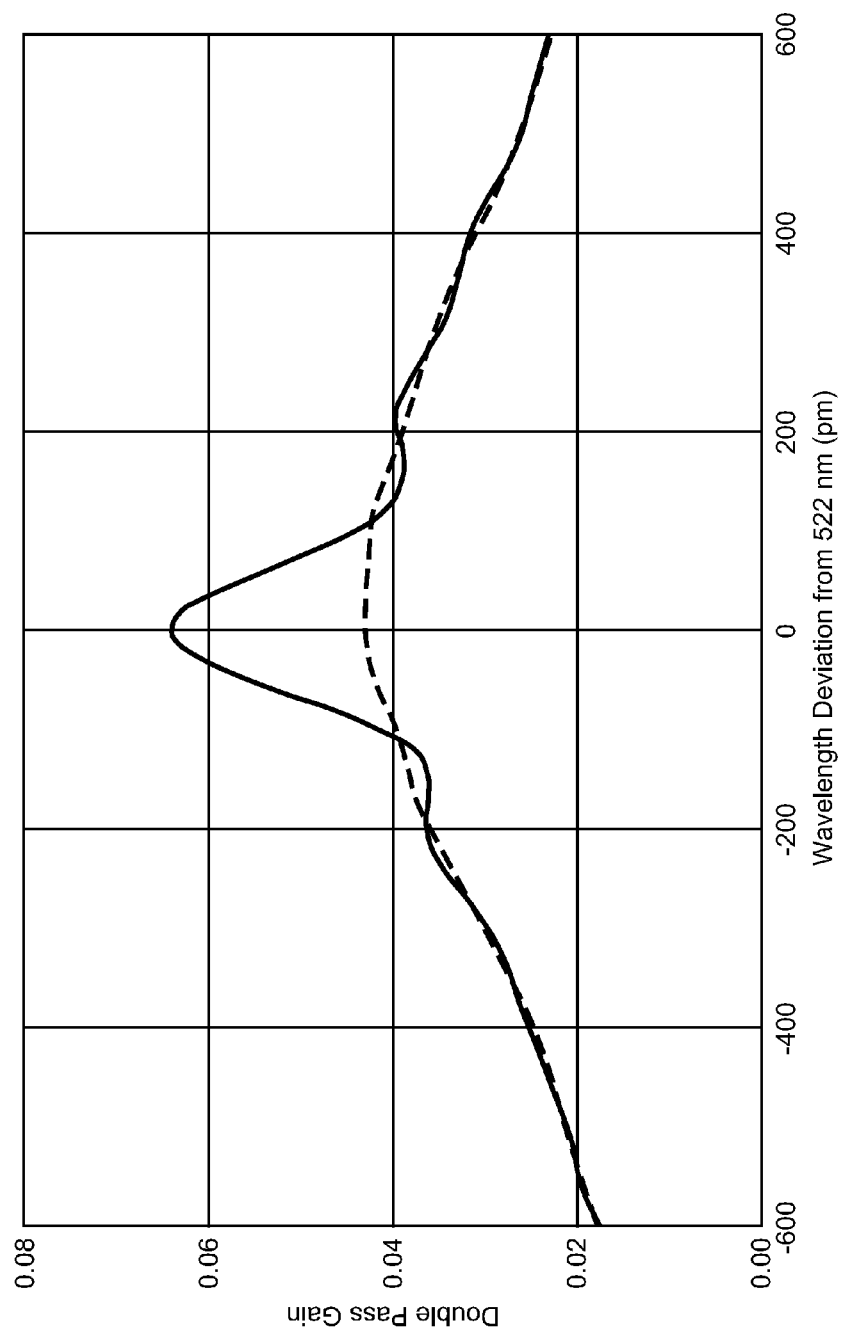
FIG. 3A is a graph schematically illustrating calculated double-pass unsaturated gain in the gain-medium as a function of wavelength deviation from a fundamental mode wavelength for coherent (with gain-fringes) and incoherent (without gain-fringes) radiation in the gain-medium of FIGS. 2A-C.

FIG. 3A is a graph schematically illustrating calculated unsaturated double-pass gain (solid curve), as a function of wavelength deviation from a fundamental-mode wavelength of 522 nm, for 0.5% doped Pr:YLF gain-medium, having a thickness of 500.0 μm, angle pumped by 4.0 W of coherent pump-radiation having a wavelength of 471.96 nm. The internal incidence (and reflection) angle of the coherent pump radiation is assumed to be 23.53 degrees to provide alignment of the antinodes of the fundamental-standing wave and the gain-grating. The dashed curve depicts the calculated unsaturated gain for incoherent radiation, i.e., without gain fringes being formed in the gain-medium but distributed according to the beam averaged gain-contours of FIG. 2A.

It can be seen that for the inventive, gain-grating case the unsaturated gain has a relatively narrow peak with a width of less than 200.0 pm-wide at FWHM above the background, which corresponds generally with that of the incoherent gain curve. This spectral-selectivity of the coherent-radiation gain results from the inventive gain grating. The peak-gain at the fundamental wavelength is significantly greater for the coherent (gain-grating) case than for the incoherent radiation case.

Figure 3B:
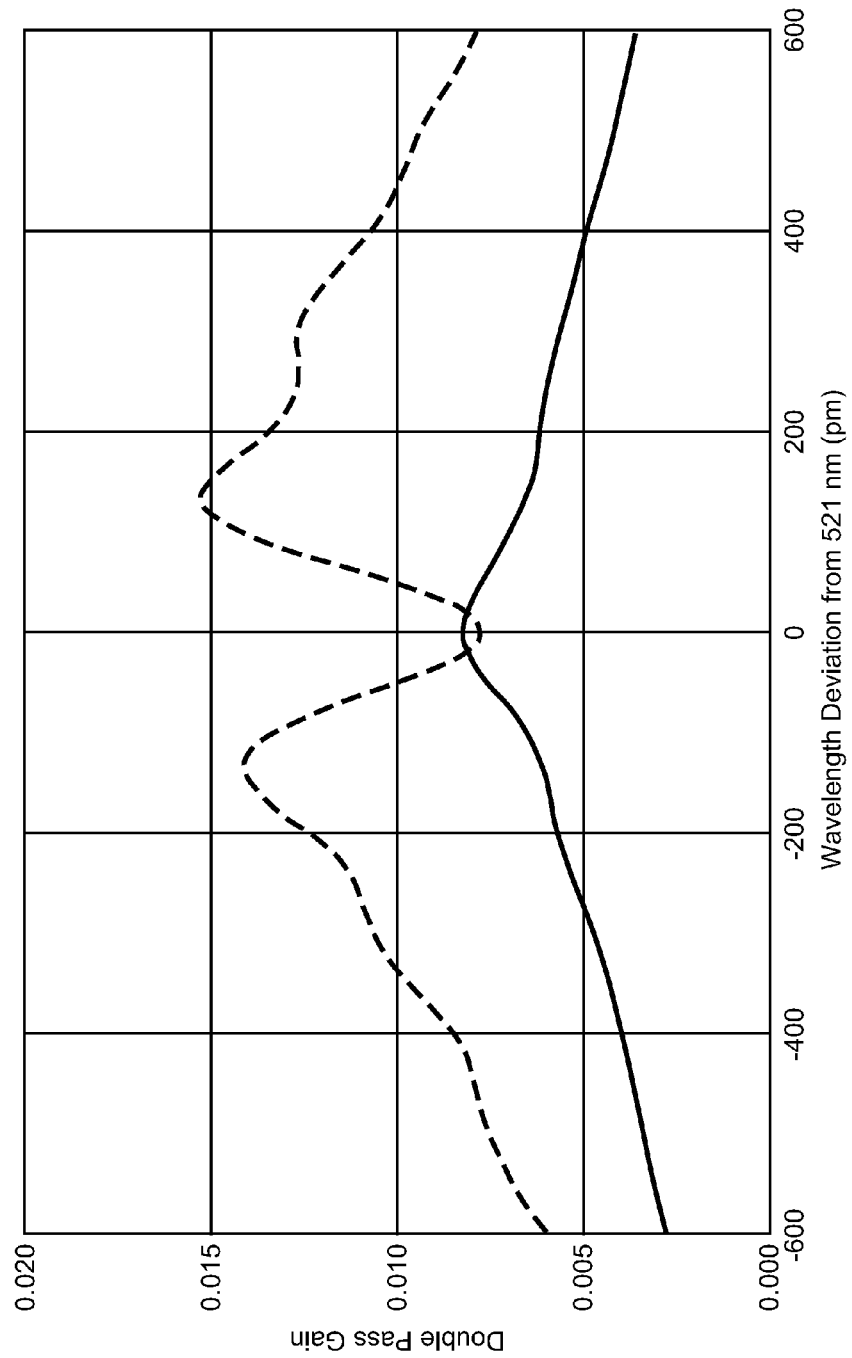
FIG. 3B is a graph similar to the graph of FIG. 3A but wherein the double pass gain is saturated at the fundamental mode wavelength.

FIG. 3B is a graph schematically illustrating calculated double-pass gain (solid curve), as a function of wavelength deviation from a fundamental-mode wavelength of 521 nm, for 0.5% doped Pr:YLF gain-medium, having a thickness of 500.0 μm, again angle pumped by 4.0 W of coherent pump-radiation having a wavelength of 471.96 nm. In this case it is assumed that 53.0 W of fundamental-wavelength (521 nm) radiation is circulating through the gain-medium, sufficient to saturate gain at the fundamental wavelength. The dashed curve depicts the calculated double-pass gain provided by incoherent radiation (no gain grating) under the same assumed conditions.

It can be seen that in the inventive (gain-grating) case, although gain is saturated at the fundamental-wavelength, the gain for any other wavelength within the ±600.0 pm range depicted is less than the fundamental-wavelength saturated gain. This wavelength range corresponds to the 1.2 nm gain-bandwidth of Pr:YLF, so no other mode can compete with the currently-oscillating fundamental mode. This means that, at least for fundamental wavelength radiation, single-mode oscillation could be sustained without any supplementary spectrally selective device in the resonator. In the incoherent-radiation pumped case, the gain-available for wavelengths other than the fundamental wavelength is greater than the saturated gain at the fundamental-wavelength at wavelengths within at least ±400.0 pm, so noisy multimode operation would result without a device of adequate spectral selectivity within the resonator.

The stratified gain created in an otherwise homogeneous gain-medium by the pump-light fringes of the present invention is vaguely similar to stratified gain in optically pumped vertical-emitting semiconductor structures resulting from gain only being available in very thin quantum-well (QW) layers spaced apart by about one-half wavelength at some wavelength in the gain-bandwidth of the QW layers. As there are typically less than twenty QW layers in such structures and as gain-bandwidth is typically about 30 nm, gain is only very weakly spectrally selective compared with the spectrally-selective gain of the present invention, and, absent any preventive measure, multiple longitudinal modes can oscillate, however the structures are optically pumped.

Figures 4, 4A:
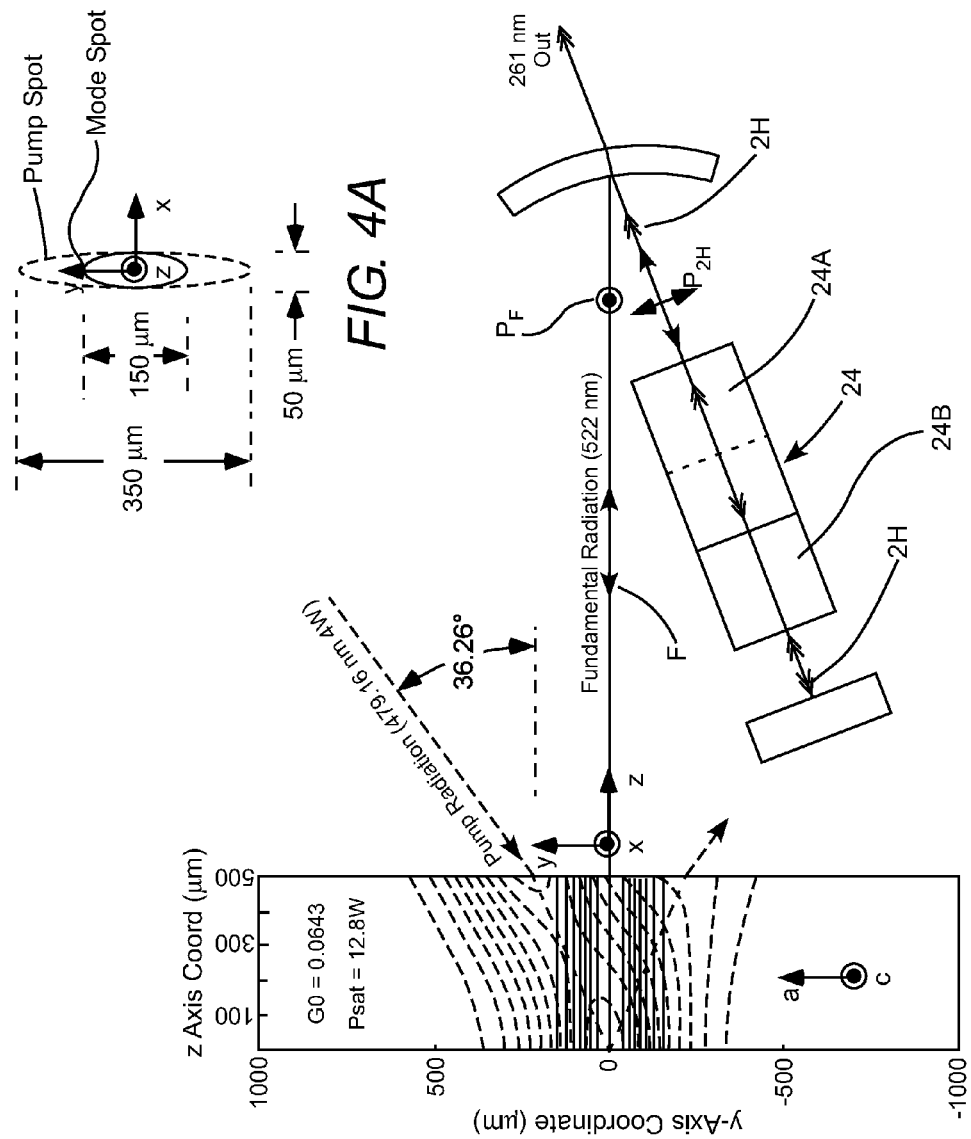
FIG. 4 schematically illustrates further detail of interaction of pump light with the gain-medium of the laser of FIG. 1 with values assumed for calculation of potential second-harmonic power output.
FIG. 4A schematically illustrates the elliptical form of the pump-light spot and the fundamental mode cross-section at the reflective surface of the gain-medium in the laser of FIG. 4.

FIG. 4 and FIG. 4A schematically illustrate the simplified preferred embodiment of the present invention depicted in FIG. 1 with the 0.5% Pr:YLF gain-medium discussed above and specific values used in calculations of potentially available second-harmonic output-power. Pump radiation is directed at an external angle of 36.26° to achieve the necessary 23.53° angle in the Pr:YLF. The gain-medium is assumed to have a small-signal gain (G0) of 0.0643 and a saturated power (Psat) of 12.8 W.

YLF is a crystal exhibiting tetragonal symmetry, with mutually orthogonal axes a=b≠c. The crystal, here, is cut such that the c-axis is perpendicular to the resonator axis. Circulating fundamental radiation is plane-polarized with the polarization-plane aligned with the c-axis of the Pr:YLF crystal as indicated by arrowhead $P_F$. The a-axis of the crystal is aligned with the y-axis of the resonator. Optically nonlinear crystal 24 is assumed to be a Brewster-cut crystal of beta barium borate (BBO) having a second-harmonic conversion efficiency (β) of $0.7 \times 10^{-4}$ per Watt. Entrance and exit faces 24A and 24B of the BBO crystal are arranged such that the fundamental radiation is incident thereon at the Brewster angle. As the 2H-radiation is polarized perpendicular to the fundamental, as indicated in FIG. 4 by arrows $P_{2H}$, there is a total reflection loss of about 0.46 at the BBO crystal faces.

FIG. 4A depicts a preferred cross-section (pump spot) of the pump-radiation beam and the fundamental mode for use in this particular embodiment of the present invention. The cross-sections here are depicted at reflective face 18B of the Pr:YLF normal to the resonator axis. The pump cross-section is elliptical with a major axis of about 330.0 μm and a minor axis of 50.0 μm measured at the $1/e^2$ points. This corresponds to a 300.0 μm by 50.0 μm ellipse measured normal to the beam-path of the pump-radiation. The mode cross-section (mode spot) is preferably elliptical with a major axis of about 150.0 μm and a minor axis of about 50.0 μm. The major axes of the pump and mode spots are preferably aligned with each other and with the a-axis of the Pr:YLF, i.e., with the y-axis of the resonator.

Figure 5:
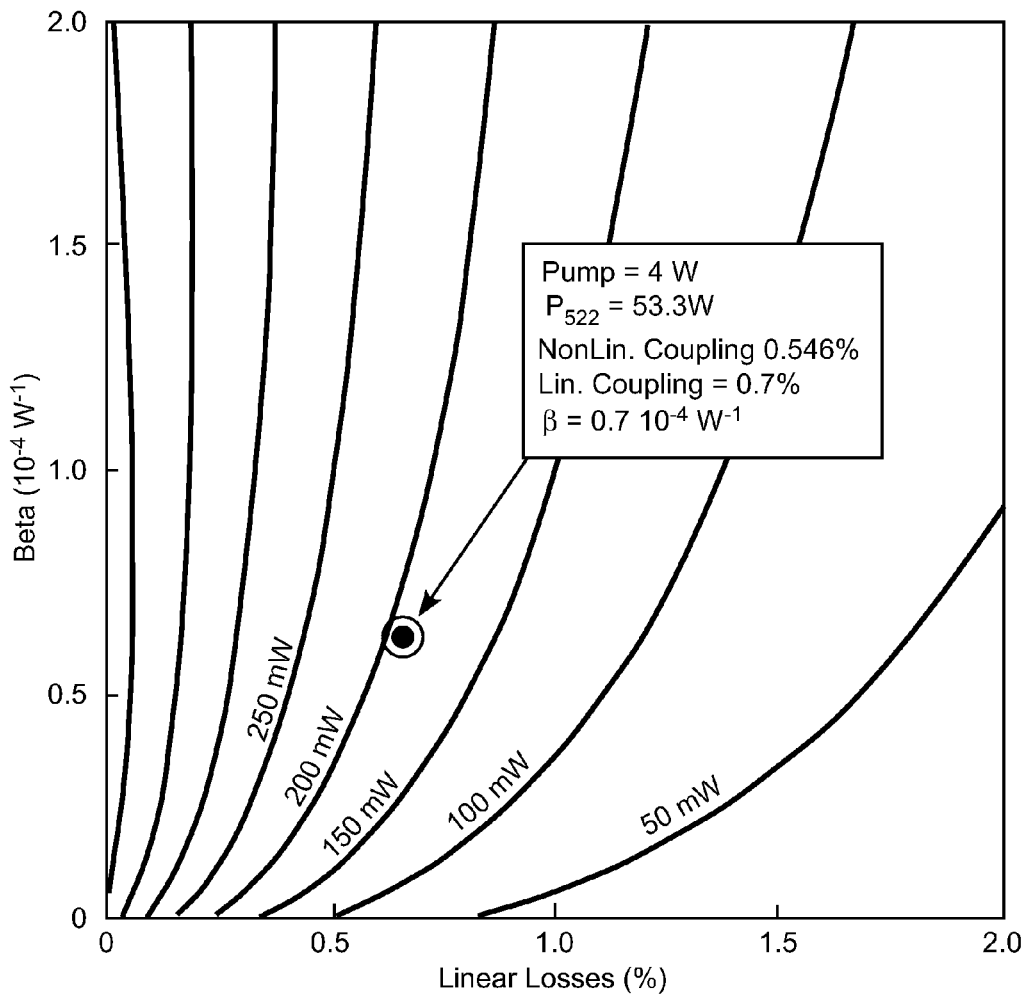
FIG. 5 is a graph schematically illustrating calculated second-harmonic power output as a function of second-harmonic conversion efficiency of the optically nonlinear crystal and linear resonator losses in the laser of FIGS. 1 and 4.

FIG. 5 is a graph schematically illustrating calculated 261 nm output-power (contours) as a function of second-harmonic conversion efficiency (β) of crystal 24 and fundamental linear resonator losses (linear coupling) given the above-discussed resonator-configuration assumptions. It can be seen that for a pump power of 4.0 W a 261 nm output-power of 199 mW is predicted for reasonable assumptions of linear and nonlinear coupling. Similar calculations were made for a case where pump light was incoherent, i.e., without the inventive gain-grating. These calculations indicated that only 133 mW of 261 nm out power would be achieved, noise problems aside.

In the discussion of spectral-selectivity of gain provided by the inventive gain-grating pumping scheme discussed with reference to FIGS. 3A and 3B, single-mode operation of the resonator is considered only from the point of view of circulating fundamental radiation, assuming, in effect, that there is no optically nonlinear crystal generating 2H-radiation in the resonator. The acceptance bandwidth of an optically nonlinear crystal is relatively narrow, typically on the order of a few picometers. When circulating fundamental-wavelength radiation is within this acceptance bandwidth, a fraction of that radiation is converted to second-harmonic radiation. This fraction, from the point of view of the fundamental-wavelength radiation is a loss. Unless the resonator is constrained to oscillate at a fundamental wavelength within the acceptance bandwidth, the resonator will oscillate at another wavelength outside the bandwidth where the loss is less.

Figure 6:
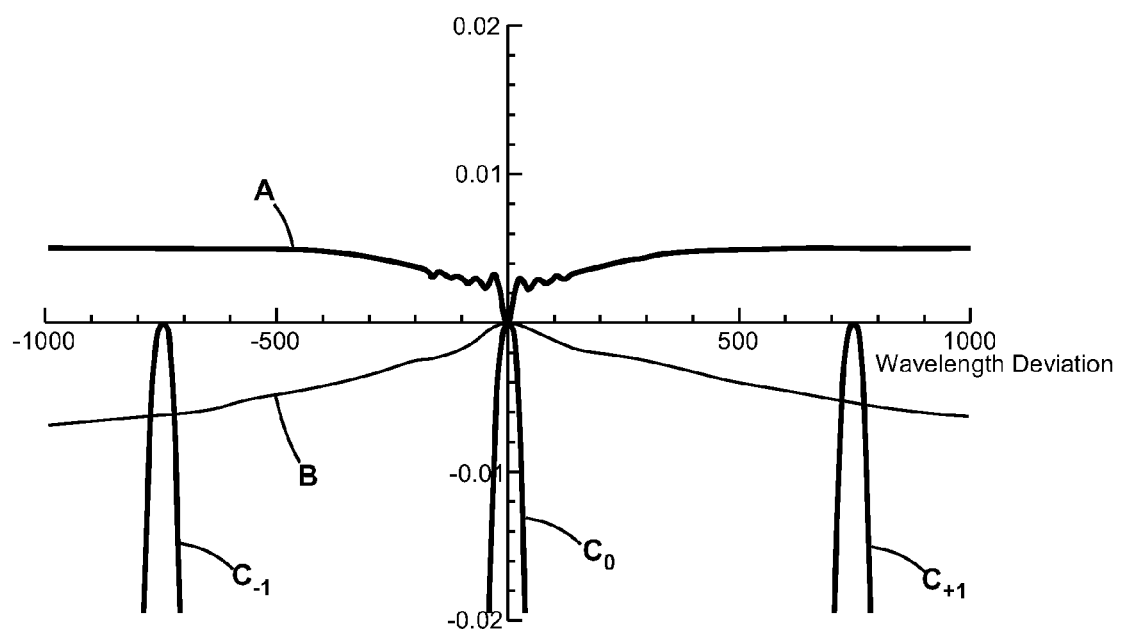
FIG. 6 is a graph schematically illustrating total resonator loss and double-pass gain as a function of wavelength deviation from a fundamental-mode wavelength together with the transmission of a 1 mm thick, un-doped YAG etalon as a function of wavelength deviation from the fundamental mode wavelength.

FIG. 6 is a graph schematically illustrating a computed value proportional to 1—the resonator loss (bold curve A) for fundamental radiation, including loss to 2H-generation, and computed double-pass gain (fine curve B) as a function of wavelength deviation from a fundamental mode wavelength (522 nm) centered in the acceptance bandwidth of the optically nonlinear crystal. The gain-curve is the saturated gain-curve of FIG. 3B for the inventive gain-grating, with gain falling on each side of the peak saturated value at the fundamental wavelength. However, it can be seen that for a wavelength deviation up to about ±200 picometers around the fundamental wavelength the decrease in loss exceeds the decrease in gain. This would allow fundamental modes to oscillate outside the acceptance bandwidth of the optically nonlinear crystal and second-harmonic generation would be zero.

Superimposed on the loss and gain graphs of FIG. 6 is the transmission spectrum of a 100 μm-thick etalon made from un-doped YAG (yttrium aluminum garnet). One transmission order $C_0$ of the etalon is aligned with the fundamental wavelength in the center of the acceptance bandwidth of the optically nonlinear crystal. Because of the spectral selectivity of the gain (due to the gain grating), the transmission band of the $C_0$ order of the etalon is sufficiently narrow to allow only a single fundamental mode centered in the acceptance bandwidth to oscillate within that bandwidth. Adjacent transmission orders $C_{-1}$ and $C_{+1}$ are sufficiently removed in wavelength from the $C_0$ order that the peak-transmission wavelengths of those orders are outside the gain bandwidth of the Pr:YLF, where gain is too low to take advantage of the low resonator loss. Because of this, single-mode operation and single-mode 261 nm-output is achieved with only a single etalon.

Figures 7A, 7B:
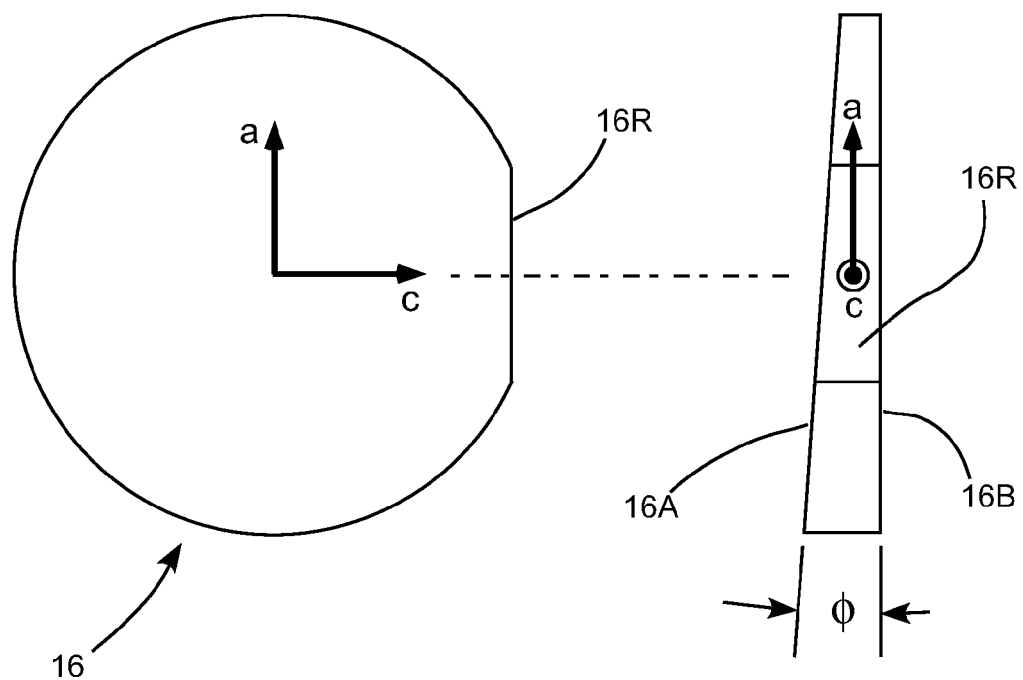
FIG. 7A is a front view schematically illustrating orientation of crystal axes in an example of a Pr:YLF gain-medium suitable for use in embodiments of the present invention.
FIG. 7B is a side view schematically illustrating further detail of the gain-medium of FIG. 7A.

In the gain-calculations discussed above it is assumed, for convenience of calculation, that the gain-medium is a parallel-sided gain-medium. In practice it is preferable to tilt the entrance surface slightly with respect to the reflective coated surface to avoid etalon effects. FIG. 7A schematically depicts one example of gain-crystal 16 seen from the front. A preferred diameter is about 5.0 mm, a straight edge 16R is parallel to the a-axis and perpendicular to the c-axis for indicating the orientation of these axes indicates the direction of the a-axis. The laser field (polarization plane) is preferably parallel to the c-axis as discussed above. Entrance face 16A is at an angle Φ of about 30.0±15.0 minutes of arc to reflective face 16B of the crystal.

Figure 8:
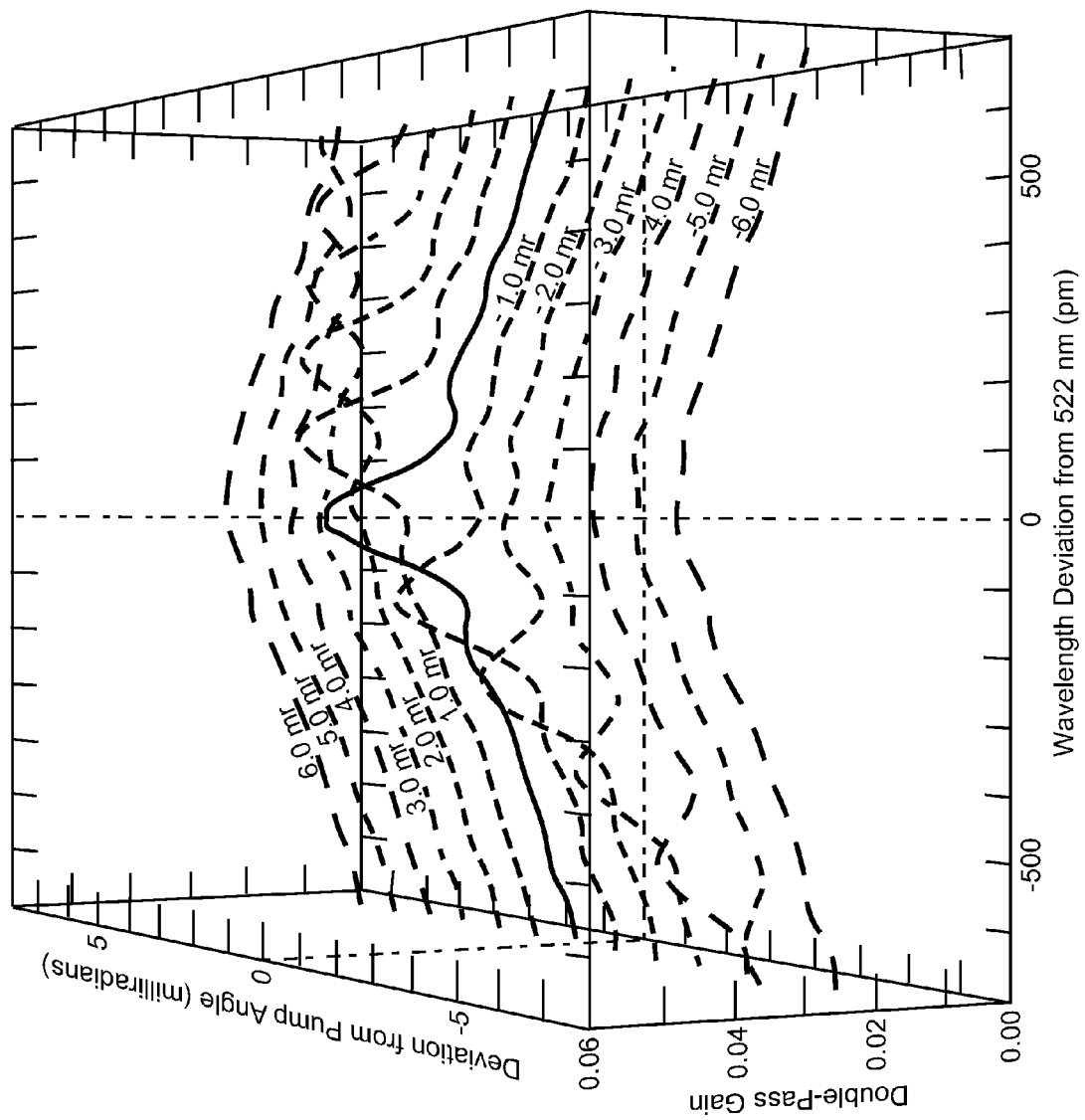
FIG. 8 is a three-dimensional graph schematically illustrating double-pass gain as a function of wavelength deviation from 522 nm and angular deviation from the optimum pump-angle in the gain-medium of FIGS. 2A-C.

It should be noted, here, that the pump-angle required to achieve a gain-grating providing spectral selectivity at the desired fundamental wavelength of 522 nm is relatively critical. By way of example, FIG. 8 is a three-dimensional graph schematically illustrating calculated double-pass gain as a function of wavelength deviation from the fundamental wavelength of 522 nm and angular deviation of pump radiation from the critical angle. The gain for the critical pump angle at 522 nm is depicted by a solid curve corresponding to the solid curve of FIG. 3A. Dashed curves indicate the double-pass gain for pump angles deviating at 1.0 milliradian (mr) intervals.

It can be seen that spectral selectivity is present at angles up to ±2.0 mr deviation from center with a of course a corresponding change in the oscillating wavelength which is selected. At ±6.0 mr deviation, the gain-curves are similar to the dashed curve of FIG. 3A which indicates the gain in the absence of fringing in the gain-medium. It is recommended that the pump-angle be maintained within about ±1 mr of the calculated critical pump-angle. Because of this criticality, wedge angle Φ (see FIG. 7B) between the faces of the gain-disk must be known with similar precision, and must be taken into account in calculating the external pump-angle required to provide the critical internal pump-angle for providing the inventive gain-grating.

It should also be noted that calculations presented above assume that the pump radiation is perfectly collimated. In practice, a finite NA (convergence) of pump radiation may lead to weaker gain-fringing and somewhat lesser advantage of the inventive pumping method.

Figure 9:
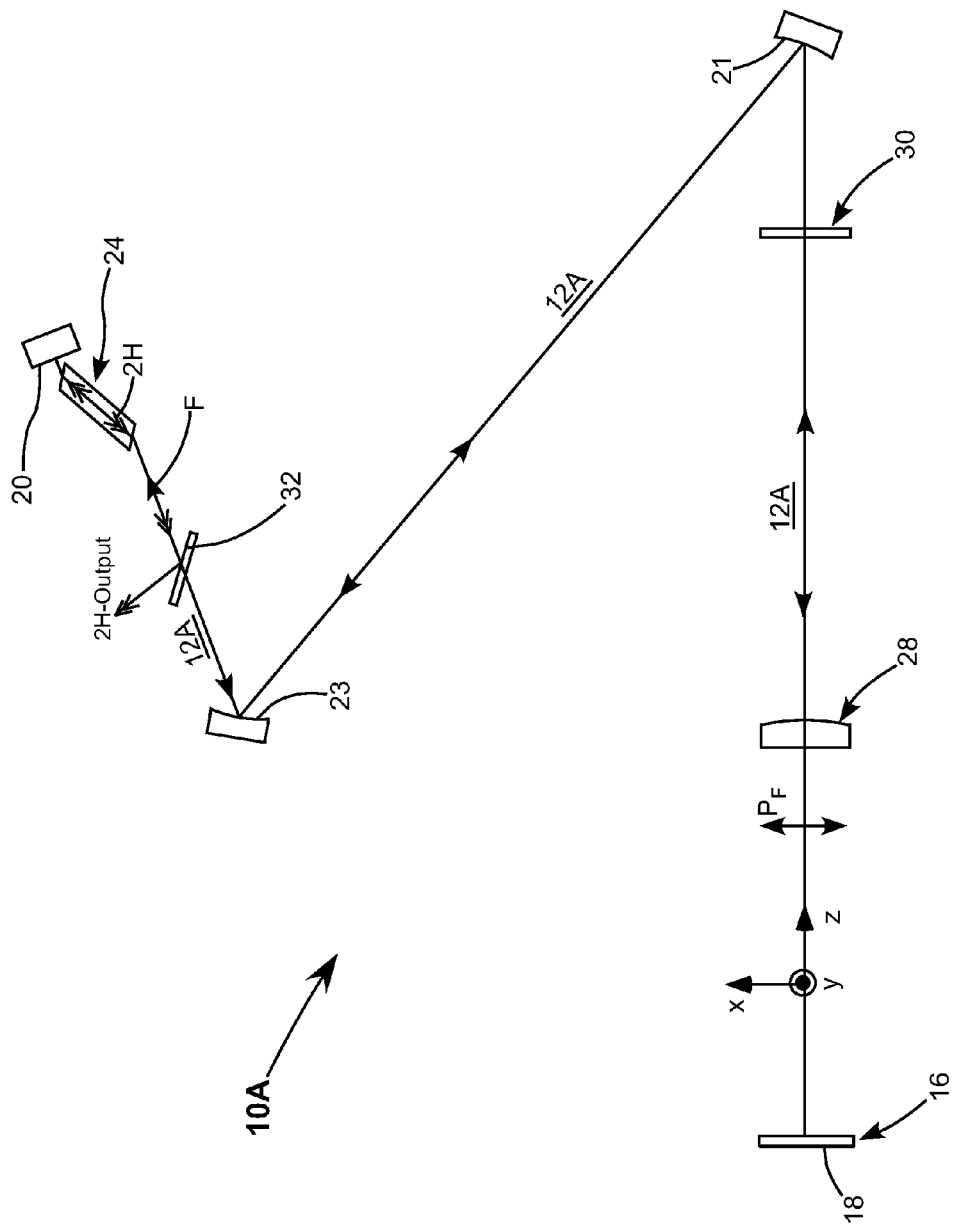
FIG. 9 is a practical resonator layout configured to provide the mode-spot shape at the gain-medium in the simplified calculation-resonator of FIGS. 4 and 4A.
Figure 9A:
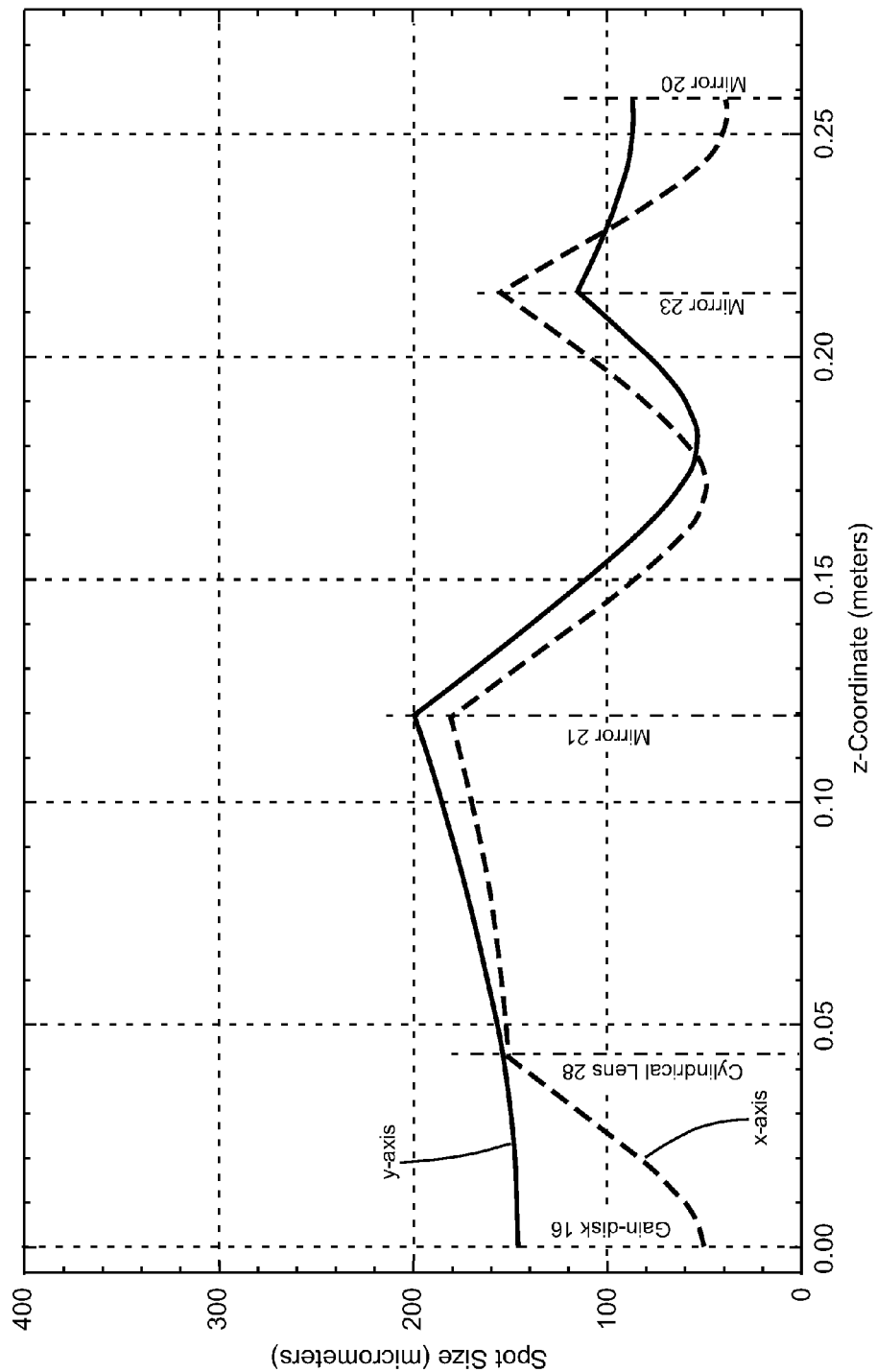
FIG. 9A is a graph schematically illustrating mode-spot radius in the x- and y-axes as a function of z-axis coordinate in the resonator of FIG. 9.

FIG. 9 schematically illustrates a preferred laser arrangement 10A having a laser-resonator 12A for providing the beam-spot dimensions in the gain-crystal and in the optically-nonlinear crystal assumed in the above-discussed calculations of double-pass gain and UV (261 nm) output power in the inventive frequency-doubled laser. Resonator 12A is terminated by reflective coating 18 on gain-disk (crystal) 16 and a plane mirror 20. The resonator is folded once by a concave mirror 21 having a radius of curvature (ROC) of 100.0 mm. The resonator is folded again by a concave mirror 23 having a ROC of 50 mm. The angles of incidence of circulating fundamental-wavelength radiation on mirrors 21 and 23 are 20° and 30.5°, respectively. Pump-radiation (not shown) is incident on the gain-disk in the y-z plane (perpendicular to the plane of the drawing).

A BBO crystal 24 having a length of 10.0 mm is in a beam-waist position immediately adjacent mirror 20. A cylindrical lens 28 having a focal length of 50.0 mm in the x-axis and 100.0 micrometer-thick uncoated YAG etalon 30 are located between the gain-disk and fold mirror 21. A dichroic beamsplitter 32, highly reflective for 261 nm radiation 2H (s-polarization), and highly transparent for 522-nm fundamental radiation F (p-polarization), directs 2H-radiation out of the resonator as output radiation.

Lens 28 is separated from disk 16 by a distance of 42.9 mm. Mirror 21 is separated from lens 28 by 76.5 mm. The position of etalon 30 is not critical. Mirrors 21 and 23 are separated by 95.5 mm. Crystal 24 is separated from mirror 23 by 32.5 mm. The position of dichroic beamsplitter 32 is not critical.

The above-described resonator configuration provides an elliptical fundamental spot size of 145.0 µm by 50.0 µm at the gain-disk and 40.0 mm (non walk-off direction) by 85.0 mm (walk-off direction) at BBO crystal 24. The G1 G2 product of resonator 12A is 0.57 in both planes.

The present invention is described above in terms of a preferred embodiment. The invention is not limited, however, to the embodiment described and depicted. Rather the invention is limited only by the claims appended hereto.

What is claimed is:

1. Laser apparatus, comprising:
a solid-state gain-medium in the form of a thin disk having first and second opposite surfaces, the gain-medium having a first mirror on the first surface thereof, and having a fundamental emission-wavelength within a gain-bandwidth of the gain medium;
a standing-wave laser-resonator formed between the mirror on the thin-disk gain medium and a second mirror, the resonator having a longitudinal axis;
a source of coherent pump-radiation, and wherein the first mirror is highly reflective of the fundamental emission wavelength and the wavelength of the pump radiation, the pump-radiation being directed into the thin-disk gain-medium via the second surface thereof at a first angle to the longitudinal axis such that the pump-radiation is incident on and reflected from the first mirror, thereby causing fundamental emission-wavelength radiation to circulate in the laser resonator and form a standing wave in the laser resonator, the first angle being selected such that the pump-radiation is incident on the first mirror at a predetermined second angle;
interference between the incident and reflected pump radiation forms volumetric pump-radiation fringes, the pump-radiation fringes thereby forming corresponding volumetric gain-fringes in the gain-medium; and
the second angle is selected such that peaks of the gain-fringes are aligned with antinodes of the standing wave of the fundamental emission-wavelength radiation, thereby maximizing gain at the fundamental emission-wavelength.

2. The apparatus of claim 1, wherein alignment of the gain-fringes with antinodes of the standing wave maximizes the gain to an extent such that when gain at the fundamental emission-wavelength is saturated due to the circulating laser-radiation, that saturated gain is greater than unsaturated gain at any other wavelength in the gain-bandwidth of the gain-medium.

3. The apparatus of claim 1, further including an optically nonlinear crystal located in the laser-resonator and arranged to generate second-harmonic radiation from the circulating fundamental emission-wavelength radiation.

4. The apparatus of claim 3 wherein the gain-medium is Pr:YLF, the fundamental emission wavelength is about 522 nm and the second harmonic radiation has a wavelength of about 266 nm.

5. The apparatus of claim 3 further including an uncoated etalon located in the laser resonator the etalon having a first transmission order at the fundamental emission-wavelength for maintaining the fundamental wavelength with in an acceptance bandwidth of the optically nonlinear crystal.

6. The apparatus of claim 5, wherein the etalon thickness and refractive index are such that second and higher transmission orders adjacent the first transmission order are at wavelengths outside of the gain bandwidth of the Pr:YLF gain-medium.

7. The apparatus of claim 1 wherein the gain-medium has a thickness between about 200 micrometers and 1000 micrometers.

8. The apparatus of claim 7, wherein the gain-medium has a thickness of about 500 micrometers.

9. The apparatus of claim 1, wherein the gain-fringes have a modulation depth of about 90% or greater.

10. The apparatus of claim 1, wherein the gain-medium is a Pr:YLF crystal with the c-axis perpendicular to the longitudinal axis of the resonator, the fundamental emission-wavelength is 522 nm, and the laser resonator is configured such that the circulating fundamental radiation is plane-polarized, with the polarization-plane aligned with the c-axis of the crystal.

11. The apparatus of claim 1 wherein the first and second opposite surfaces of the thin disk gain medium are not parallel.

12. A method of operating a laser system, said laser system having a thin disk gain medium for generating light at a fundamental wavelength, said gain medium being located within an optical resonator, said laser system further including a non-linear crystal located in the resonator for converting the fundamental wavelength into higher harmonic wavelength, said laser system including a pump laser for generating a pump beam of radiation for pumping the gain medium through an entrance surface thereof and wherein a reflective element is provided on the opposed rear surface of the gain medium, the reflective element being highly reflective of the fundamental wavelength and the wavelength of the pump radiation said method comprising the steps of:

directing the pump beam of radiation at a non-normal angle to entrance surface of the gain medium, said angle being selected so that portion of the pump beam not absorbed by the gain medium and reflected back through the gain medium by the reflective element creates interference gain fringes within the gain medium, said interference gain fringes being arranged to reduce power fluctuations in the laser output.

13. A method as recited in claim 12 wherein the interference gain fringes are aligned with the antinodes of a standing wave pattern of the fundamental radiation circulating in the resonator.

14. A method as recited in claim 13 wherein said laser further includes an etalon in the cavity to further reduce noise.

15. A method as recited in claim 14 wherein the thin disk gain medium is formed from Pr:YLF.

16. A method as recited in claim 15 wherein the entrance and rear surfaces of the think disk gain medium are not parallel.

* * * * *